No. 652,940. Patented July 3, 1900.
G. E. WHITNEY.
MOTOR VEHICLE.
(Application filed Jan. 21, 1898.)
(No Model.) 8 Sheets—Sheet 5.

Witnesses.
Edward F. Allen.
Thomas J. Drummond.

Inventor:
George E. Whitney
By Crosby Gregory
attys

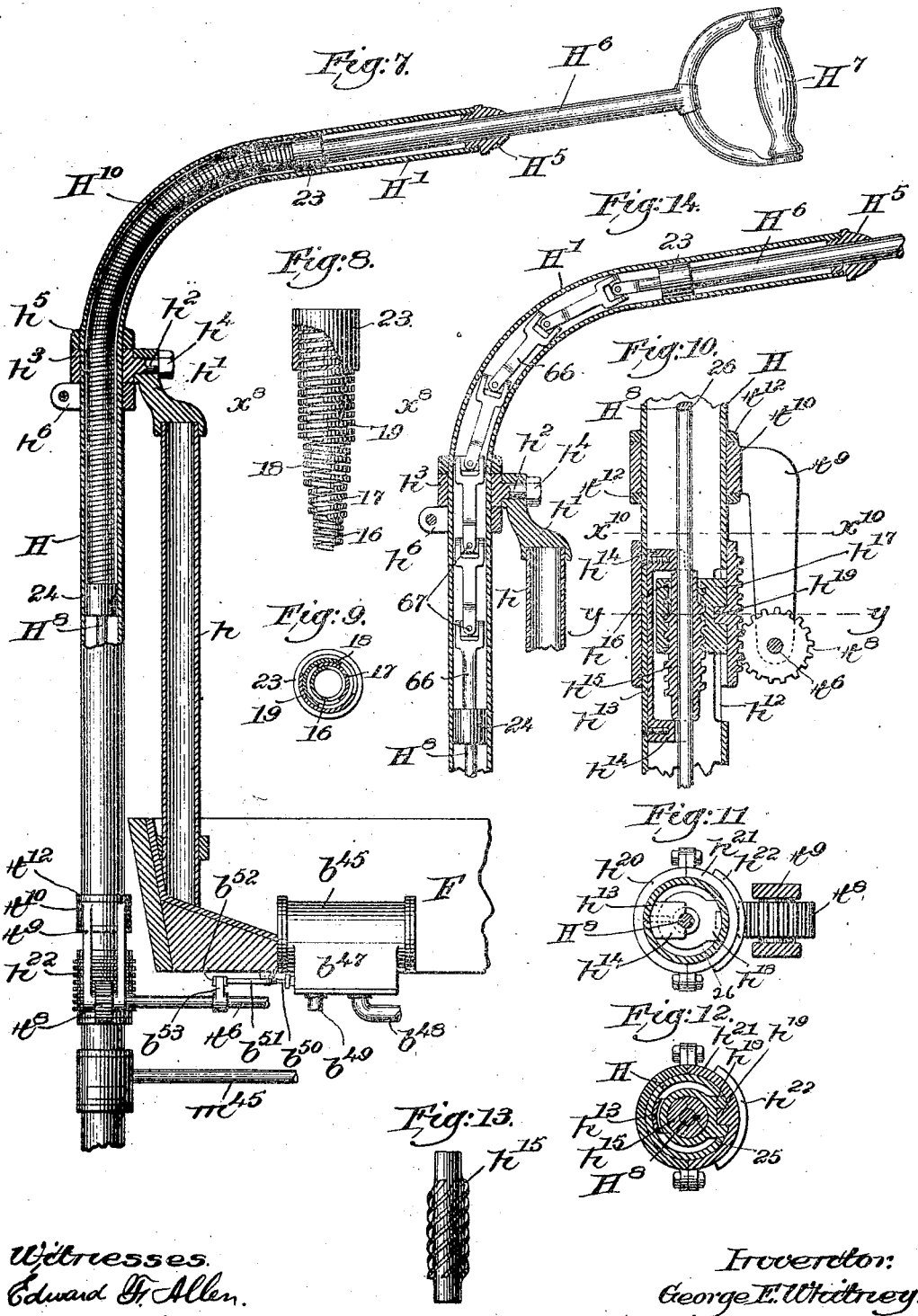

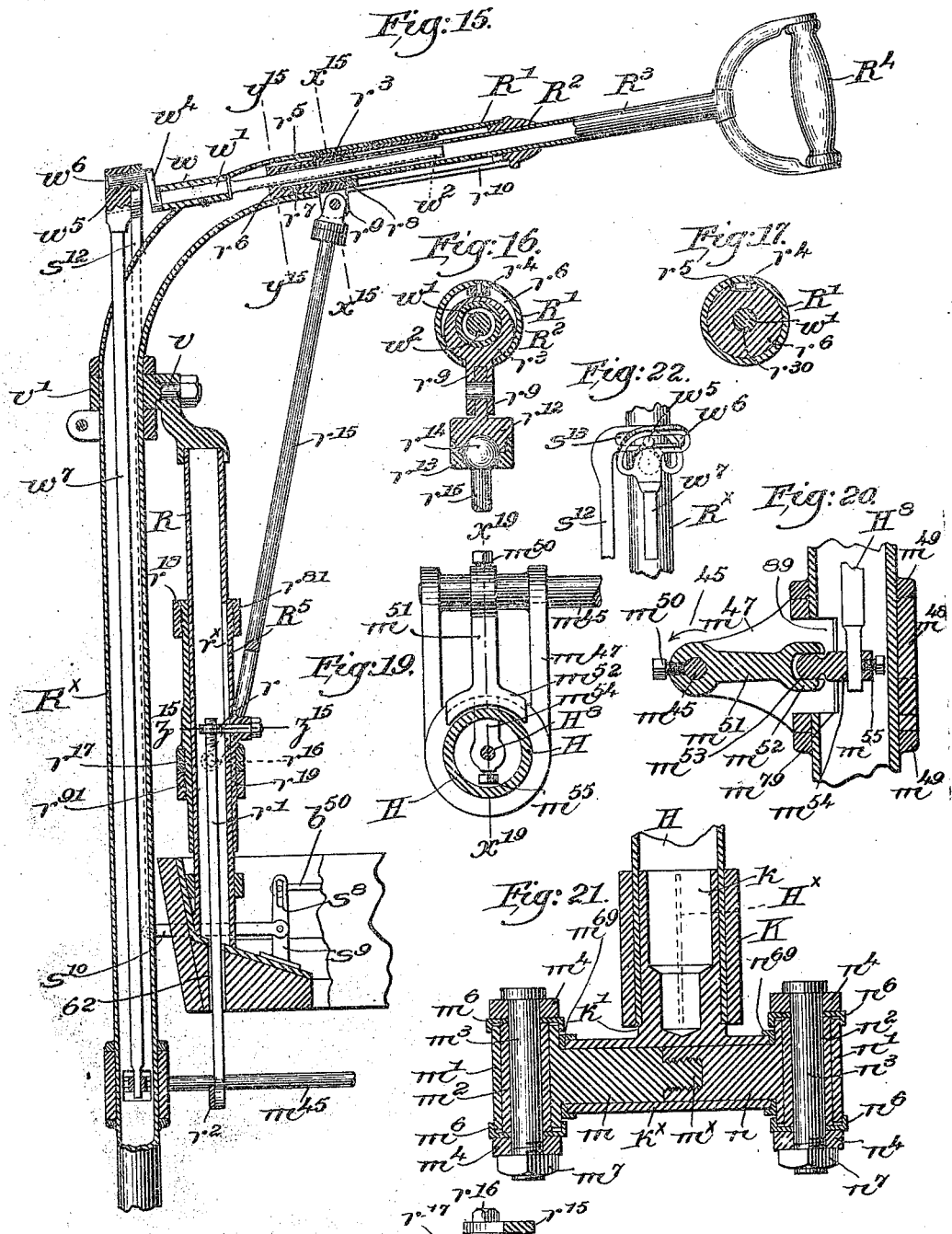

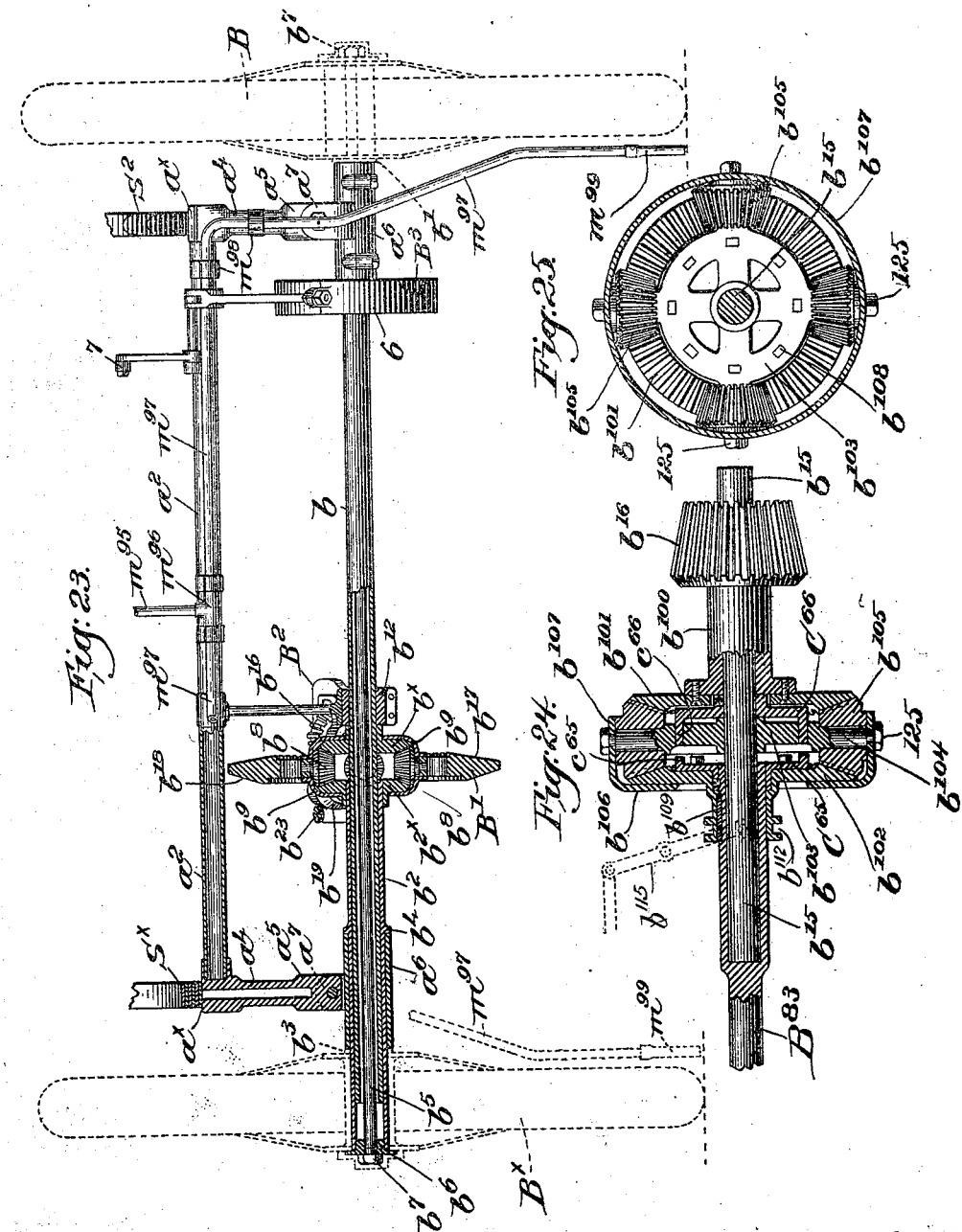

UNITED STATES PATENT OFFICE.

GEORGE E. WHITNEY, OF BOSTON, MASSACHUSETTS, ASSIGNOR TO THE WHITNEY MOTOR WAGON COMPANY, OF SAME PLACE.

MOTOR-VEHICLE.

SPECIFICATION forming part of Letters Patent No. 652,940, dated July 3, 1900.

Application filed January 21, 1898. Serial No. 667,391. (No model.)

*To all whom it may concern:*

Be it known that I, GEORGE E. WHITNEY, of Boston, county of Suffolk, State of Massachusetts, have invented an Improvement in Motor-Vehicles, of which the following description, in connection with the accompanying drawings, is a specification, like letters and figures on the drawings representing like parts.

This invention relates to motor or horseless vehicles wherein the motive power of whatever nature is carried by the vehicle itself, and the mechanism hereinafter described is applicable to a vehicle propelled by any kind of mechanical motive power, though, as will appear hereinafter, the invention is especially useful when steam or other expansible medium is employed as the motive power.

The engine and boiler herein shown as providing the motive power are not described in detail, as they form the subject-matter of Patent No. 601,218, granted to me March 22, 1898, and the various features relating particularly to the engine and boiler are therein claimed, and accordingly only enough of such motive apparatus will be hereinafter described as may be necessary to clearly show the relation of the motor devices to the vehicle and controlling means.

Figure 1:
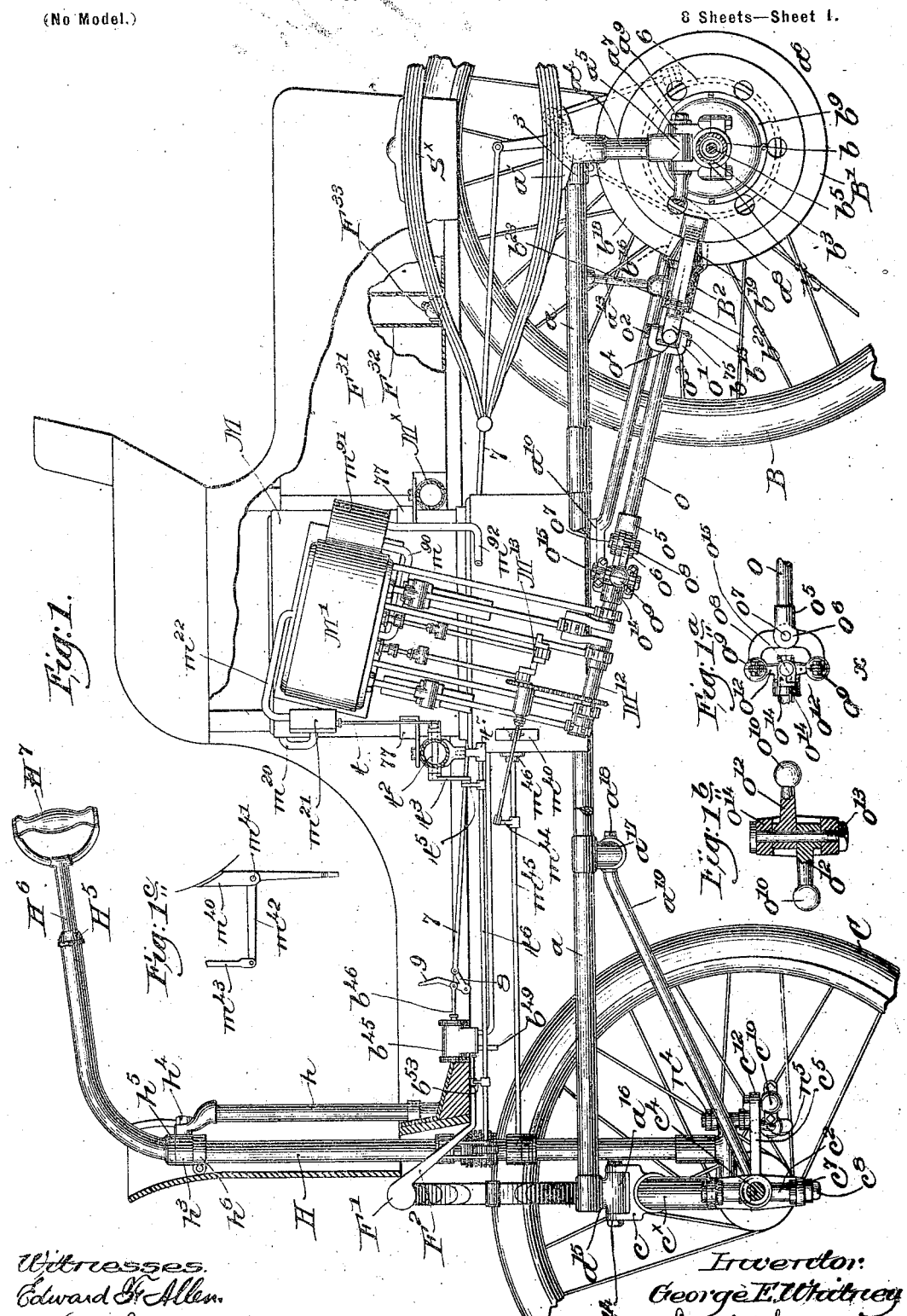
Figure 2:
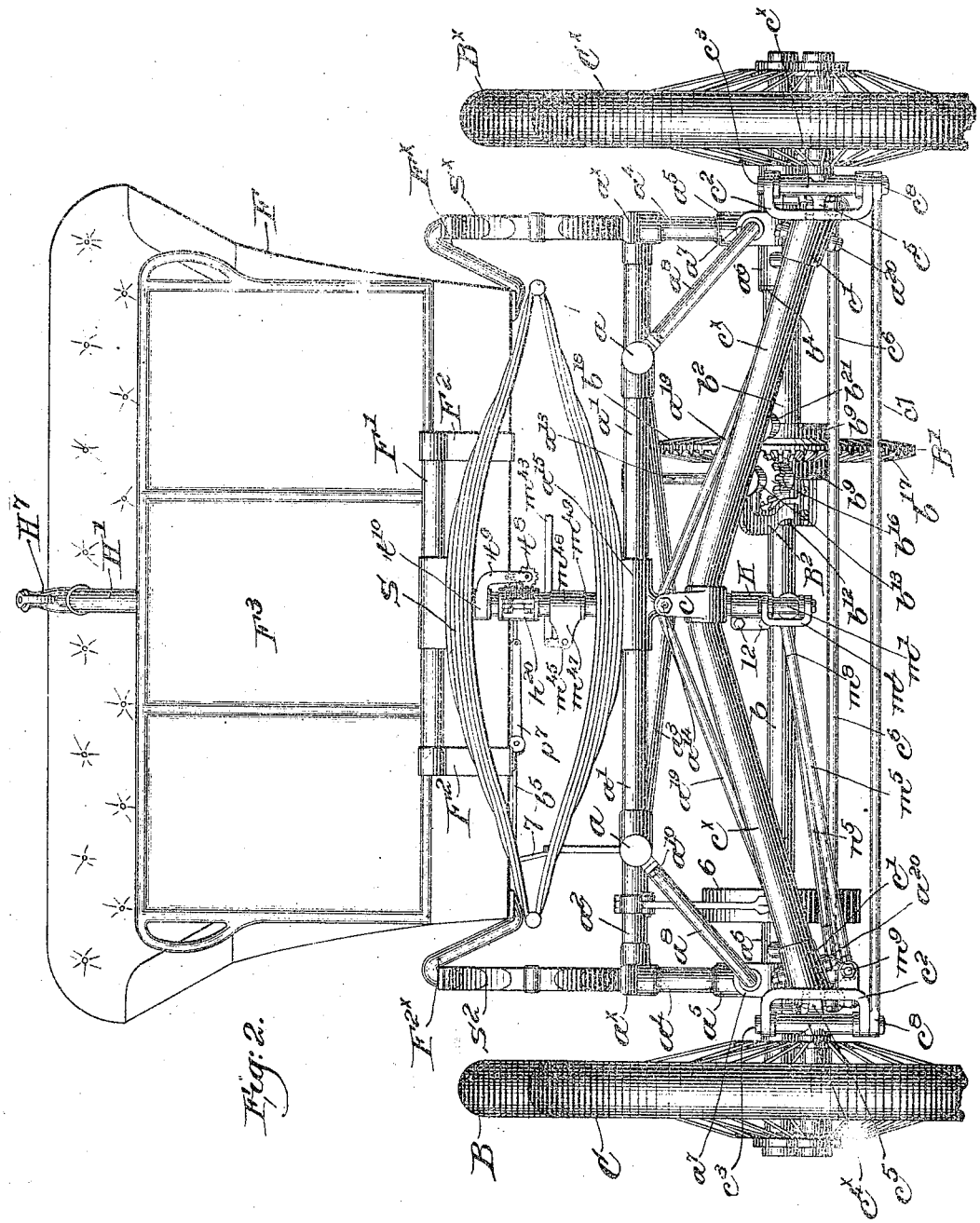
Figure 3:
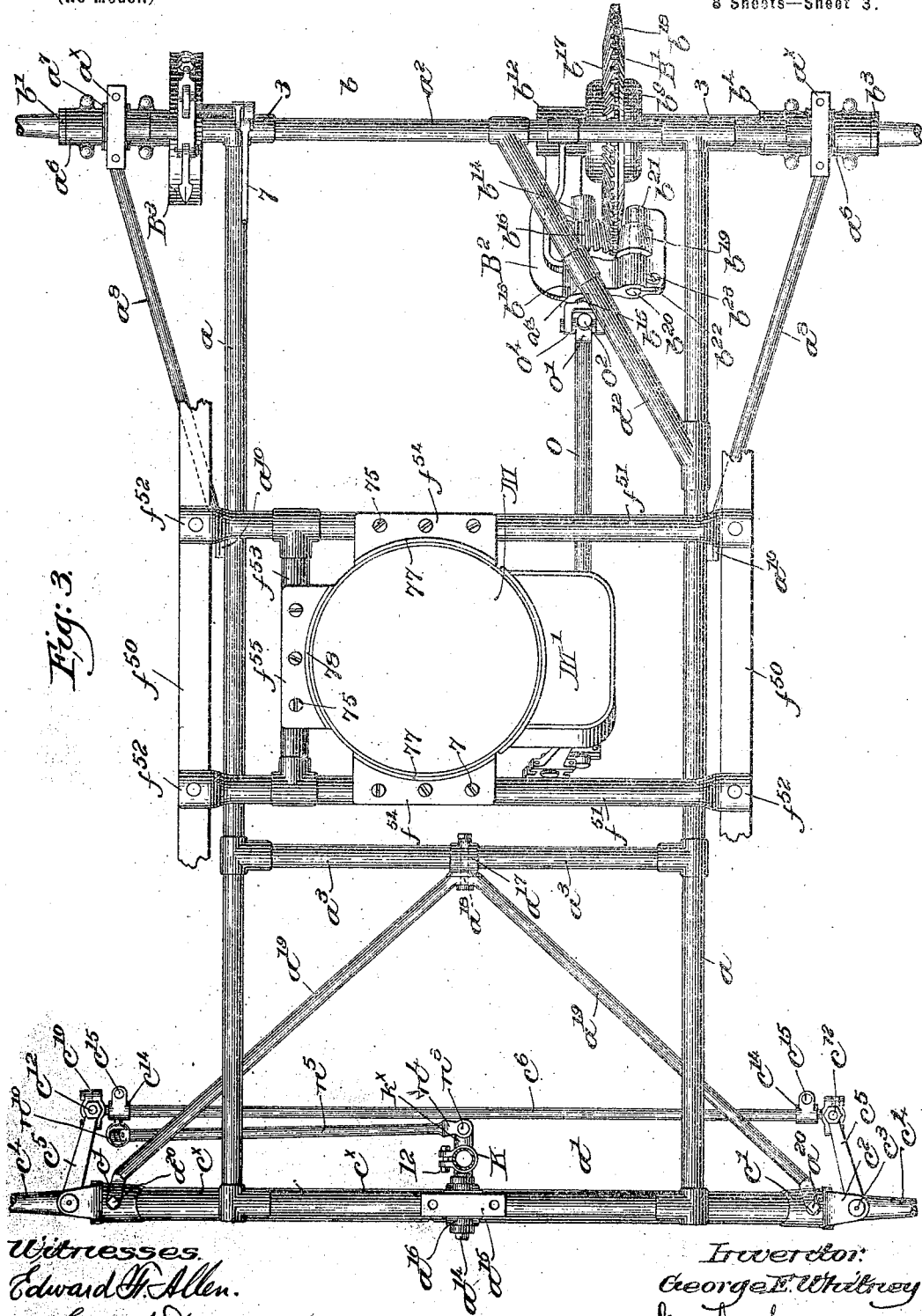
Figure 4:
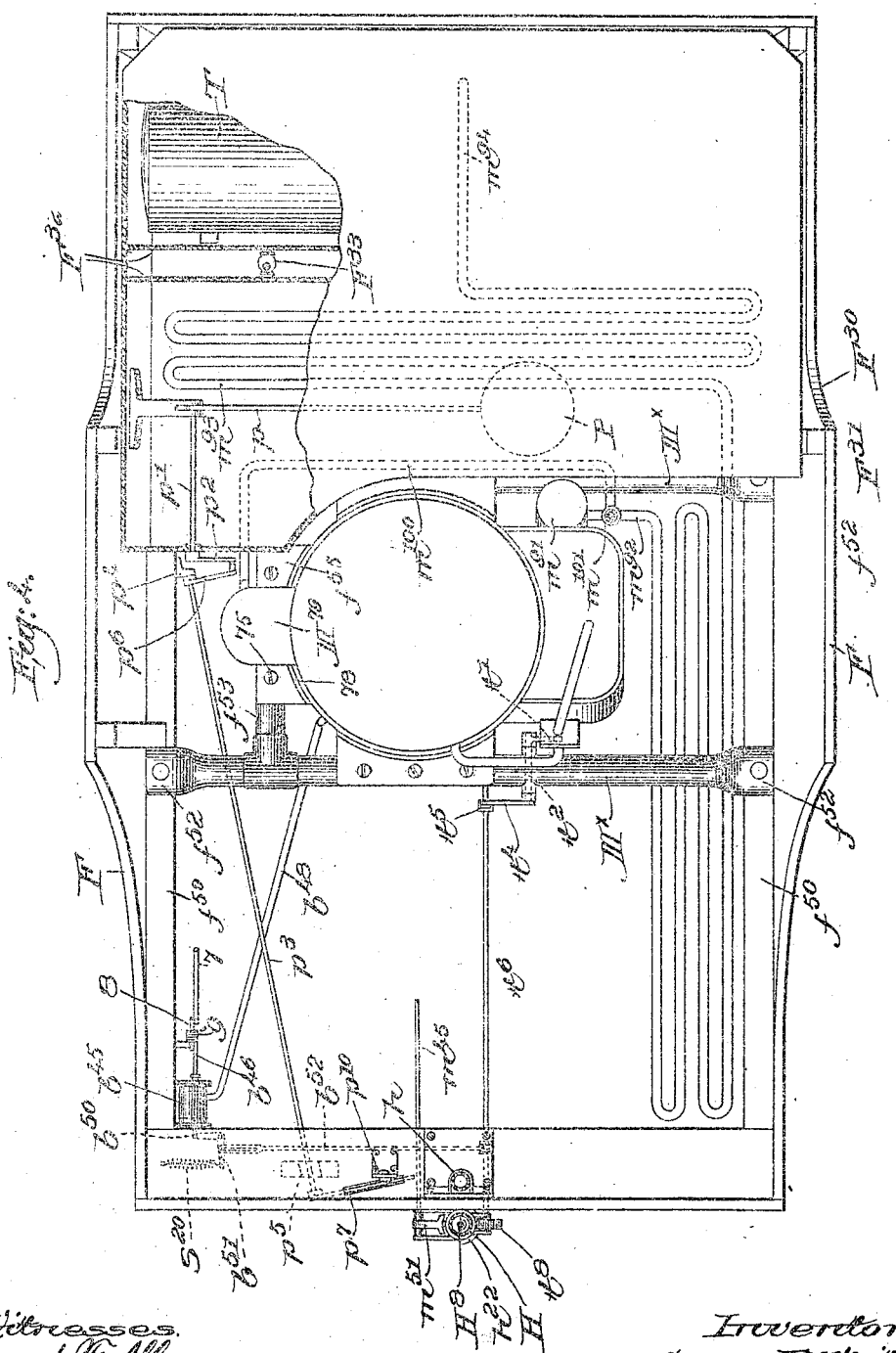
Figure 5:
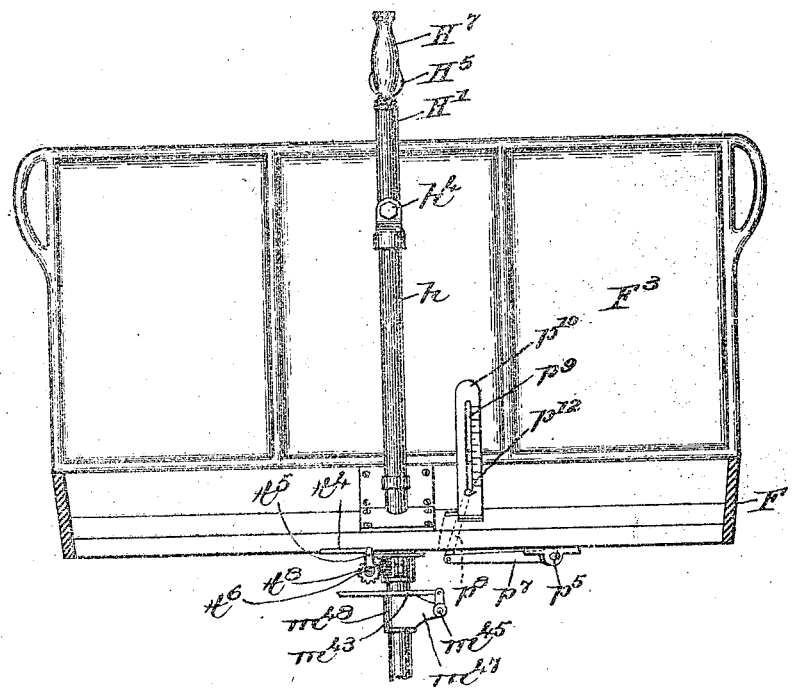
Figure 6:
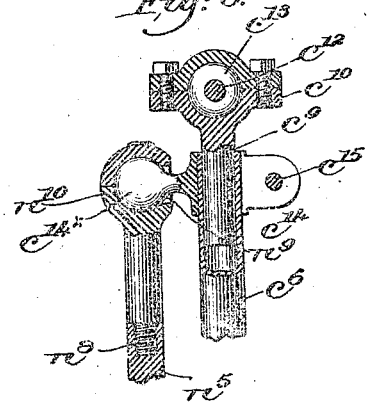

Figure 1, in side elevation and partly broken out, represents a motor-vehicle embodying my invention, the nearer wheels being omitted to avoid confusion and more clearly show the general construction. Fig. 1$^a$ is an enlarged detail view of the universal and extension joint intermediate the motor-shaft and the vehicle-driving shaft. Fig. 1$^b$ is a sectional view on the line $x$ $x$, Fig. 1$^a$. Fig. 1$^c$ is a plan detail of part of the reversing means. Fig. 2 is a front elevation of the vehicle, the lower portions of the wheels being broken out and the motor omitted to avoid confusion. Fig. 3 is a top or plan view of the vehicle-frame, showing more clearly the support for the motor, said support, however, being secured to the body of the vehicle, the connection between the motor and the driving-shaft being also shown. Fig. 4 is a top or plan view, partially broken out, of the vehicle-body to illustrate the location of the motor, steering-head, and other devices. Fig. 5 is an inner elevation of the dashboard, showing the steering head or post and the water-level indicator for the supply-tank. Fig. 6 is an enlarged horizontal sectional detail of one of the connections between the steering-head and the steering-wheels. Fig. 7 is an enlarged vertical section and partial elevation of one form of controlling means for steering, and regulating the speed and the forward or backward movement of the vehicle. Fig. 8 is a detail view showing the construction of the flexible member of said controlling means and the mode of attaching it to its actuating member. Fig. 9 is a transverse sectional view of Fig. 8 on the line $x^9 x^9$. Fig. 10 is an enlarged vertical sectional view of the lower part of the steering-head to be described. Fig. 11 is a transverse sectional view thereof on the line $x^{10} x^{10}$, Fig. 10. Fig. 12 is a like view on the line $y^{10} y^{10}$, Fig. 10. Fig. 13 is a detached view in elevation of the threaded sleeve shown in section in Fig. 10. Fig. 14 is a vertical sectional detail view of another form of flexible member forming a part of the controlling means. Fig. 15 is a vertical sectional view of a modified form of controlling means to be described. Fig. 16 is an enlarged transverse sectional view thereof on the line $x^{15} x^{15}$, Fig. 15. Fig. 17 is a similar view on the line $y^{15} y^{15}$, Fig. 15. Fig. 18 is a like view taken through the support for the steering-head on the line $z^{15} z^{15}$, Fig. 15. Fig. 19 is an enlarged plan view, partly in section, of the actuating connection at the lower end of the steering-head for the speed-regulating device. Fig. 20 is a sectional view of the said actuating connection on the line $x^{19} x^{19}$, Fig. 19. Fig. 21 is an enlarged detail in section of the lower end of the steering-head to more clearly show the dust-proof connections between the head and a part of the steering mechanism proper. Fig. 22 is an enlarged detail view of a portion of the mechanism shown in Fig. 15, to be hereinafter referred to. Fig. 23 is an enlarged rear elevation of the supporting-frame for the rear or driving wheels, one of the axle-bearings, compensating device, and a portion of the frame being shown in section. Fig. 24 is a sectional view, on a large scale, of a variable-power device adapted to form a part of the power-transmitting connection between the motor and driving wheels illustrated in Figs. 1 and 3, said speed-changing device being omitted therefrom for the sake of clearness; and Fig. 25 is an elevation of a portion of said device to be described.

The frame of the vehicle is best shown in Fig. 1 and comprises side bars $a$, front and rear cross-bars $a'$ $a^2$, respectively, and an intermediate cross-bar $a^3$ near the forward end of the frame, the frame being preferably constructed of tubing to secure combined lightness, strength, and resiliency, the parts being securely connected and held together by suitable joints. The rear cross-bar $a^2$ is shown as extended beyond the couplings 3, by which it is connected with the side bars, and at its extremities the cross-bar is secured to forgings $a^4$, (see Fig. 23,) which may be made hollow, if desired, the upper ends of the forgings forming elongated spring-seats $a^x$ for the rear springs of the body, the uprights $a^4$ thus presenting very strong vehicle-supporting members and depending from the frame to form seats $a^5$ at their lower ends. Sleeve-like bearings $a^6$, having upturned ears $a^7$, which embrace the seats, are secured in place thereupon by the bolt-like ends of stay-rods $a^8$, which pass through said ears and the seats and are secured in place by suitable nuts $a^9$, the other ends of the stays being carried up and rigidly secured to the side bars at $a^{10}$.

The driving-axle is herein shown as compound, comprising a hollow shaft $b$, to which one of the rear driving-wheels B is rigidly connected, the shaft extending through and being rotatable in the bearing $a^6$ at the right hand, Fig. 23, said shaft having an annular flange $b'$ thereon to rest against the outer end of the bearing. This shaft $b$ extends entirely across the frame and terminates at a point within the hub of the left-hand driving-wheel B$^x$, Fig. 23, as herein constructed, passing through the adjacent bearing $a^6$; but a sleeve $b^2$, to which said wheel-hub is rigidly secured, passes through the bearing, embracing the shaft $b$, said sleeve having collars or flanges $b^3$ $b^4$ thereon to engage the ends of the bearing and receive end thrust. A rod $b^5$ is extended through the shaft $b$ and at each end passes through a flanged collar $b^6$, the body of the collar entering the outer end of the wheel-hub, while its flange rests against the outer end of the hub, the wheels being held from separation by nuts $b^7$ on said rod, and in case the shaft $b$ or the sleeve $b^2$ should break they are still held from separating by said rod $b^5$. By reference to Fig. 23 it will be seen that the long engagement of the shaft $b$ and sleeve $b^2$ provides a strong and rigid axle, one part of which is rotative relatively to the other to permit differential speed of the driving-wheels B B$^x$ when turning corners or moving on curves. Bevel-gears $b^x$ $b^{2x}$ are rigidly attached to the shaft and sleeve, respectively, between the center of the axle and one of the bearings $b^6$, and meshing with a series of four intermediate gears $b^8$, four being preferably used, rotatably mounted on a large gear-carrier B', a suitable cap or casing $b^9$ protecting the gears from dust, &c. Rotation of the carrier B' causes simultaneous rotation of the shaft $b$ and sleeve $b^2$, the intermediate gears $b^8$ then locking the two members of the compound axle together; but if one of the rear wheels travels faster than its fellow the said intermediate gears will rotate on their axes, permitting such differential rotation of the wheels in well-known manner. Broadly speaking, this compensating mechanism is not broadly new; nor is the two-part axle new.

The corner portion of the frame above the compensating mechanism is additionally braced by a diagonal bar $a^{12}$, Fig. 3, having a hanger $a^{13}$ jointed thereto and jointed at its lower end to a bracket B$^2$, the joints being shown in Fig. 1 as of ball-and-socket form. The rear end of the bracket is shaped to provide a bearing $b^{12}$ for the rear axle adjacent the compensating mechanism, and the bracket is further provided with bearings $b^{13}$ $b^{14}$ for a short shaft $b^{15}$, having secured to it between said bearings a bevel-pinion $b^{16}$, in mesh with a gear $b^{17}$ on the adjacent side of the gear-carrier B'. As shown in Figs. 3 and 23, the opposite side of the carrier is beveled, as at $b^{18}$, and travels over a preferably-conical roll $b^{19}$, rotatably mounted directly opposite the said pinion on an eccentric-shaft $b^{20}$, held in a boss $b^{21}$ of the bracket and a clamp $b^{22}$. When the roll wears, the eccentric-shaft $b^{20}$ can be partially turned to adjust said roll by first loosening the clamping-screw $b^{22}$.

It will be seen that the gear $b^{17}$ and its actuating-pinion $b^{16}$ are maintained accurately in mesh and without lateral separation by the rolling bearing $b^{19}$, the carrier B' being also held in place thereby between the gears $b^2$ and $b^{2x}$, while said rolling bearing also takes up the side thrust of the gear-carrier and maintains the proper pitch-line of the pinion and meshing gear $b^{17}$.

The pinion-shaft $b^{15}$ is connected with the actuating-shaft of the motor, as will be described, and in practice the gear $b^{17}$ and pinion $b^{16}$ and the adjacent parts will be inclosed in a suitable protective casing. (Not shown.)

A band-brake wheel B$^3$ is secured to the shaft $b$, as herein shown, with which coöperates a suitable friction-band 6, operated by a rod 7 and connections at its rear end, said rod extending at its front end up through the floor of the vehicle-body and being there connected pivotally with a bell-crank lever 8, having a footpiece 9 in reach of the operator's foot.

Power mechanism for applying the brake will be described hereinafter in connection with other parts which coöperate therewith.

Referring to Fig. 2, the front axle is shown as a dropped down or bent bar or tube $c^x$, having rigidly secured to its central high point an upturned yoke $c$, through the arms of which the king-bolt $a^{14}$ is passed. The front bar $a'$ has mounted thereon a spring-seat $a^{15}$, having a depending bearing $a^{16}$ for the king-bolt, Figs. 1 and 2, and the cross-bar $a^3$ also has a depending central bearing $a^{17}$ for a pivot pin or bolt $a^{18}$ in parallelism with the longitudinal central axis of the frame and in alinement with the king-bolt $a^{14}$.

Referring to Figs. 1, 2, and 3, the substantially V-shaped front reach $a^{19}$ is supported at the apex by the pivot-pin $a^{18}$ and is preferably forked at its ends to embrace the hubs $c'$ of yokes $c^2$, secured to the end of the front axle $c^x$, bolts $a^{20}$ connecting the ends of the reach and the yokes, the reach thus acting to brace the axle against fore-and-aft strains, while permitting it to rock on the king-bolt. The yokes $c^2$ are arranged vertically and outturned, Fig. 2, to receive vertical pivots $c^3$, on which the horizontal outwardly-extended wheel-spindles $c^4$ are adapted to rock, the wheels C and $C^x$ being rotatably mounted on the spindles, the upright hubs $c^{4x}$ of the spindles having secured thereto or forming a part thereof inwardly-inclined lever-arms $c^5$, Fig. 3, pivotally attached at their free ends to a connecting-rod $c^6$. I have herein shown the pivots $c^3$ extended below the yoke-arms to enter eyes in a truss-rod $c^7$, the rod and axle $c^x$ forming a very rigid, strong, and comparatively light truss-frame, on which the front wheels are supported, suitable nuts $c^8$ retaining the truss-rod $c^7$ in place.

In order to attain greater freedom of movement of the parts and a better protection from dust, &c., I have made ball-and-socket connections between the lever-arms $c^5$ and the connecting-rod $c^6$. For convenience the rod is made hollow, and the shanks $c^9$ of socket members $c^{10}$ (see Fig. 6) are secured in the ends of the hollow rod, while the pivots $c^{13}$, depending from the lever-arms, are formed with ball ends $c^{13}$ to enter the socket members, the construction of the socket members being best shown in Figs. 1, 2, 3, and 6. A convenient manner of securing the shanks of the socket members in the tubular rods $c^6$ is by split collars $c^{14}$, surrounding the rod at its ends, which latter may be slotted, if desired, compression of the collars thereupon being effected by bolts $c^{15}$.

By mounting the front wheels as described they are swung bodily on their vertical fulcra $c^3$, the steering of the vehicle being greatly facilitated and the power required for steering very much reduced. The lever-arms $c^5$ are set at like angles to the normal running plane of the front wheels, and by the connection $c^6$ will be moved in unison, but the wheel at the side toward which the vehicle is to be turned will be deflected more than the opposite wheel, so that both may describe arcs of different circles and there will be no sidewise scraping of the wheels in turning corners. The steering is made easier, for instead of moving the entire axle only the wheels and their journal-spindles are swung.

The body F of the vehicle is hung at its front end on a transverse spring S of suitable construction secured to the spring-seat $a^{15}$, a cross-bar F', rigidly attached to the top of the spring, being secured by straps $F^3$ to the front end of the body. At its back the body is supported on side springs $S^x$ and $S^2$ by means of suitable straps $F^x$ $F^{5x}$, Fig. 2, the springs themselves being secured rigidly to the seats $a^x$ on the depending members $a^4$ of the rear-axle drop-frame. The body is thus yieldingly connected with the main frame, much as in an ordinary vehicle, with all the attendant advantages of springiness and ease of motion in riding.

Any suitable form of step may be provided for the convenience of persons getting into or out of the body, and inasmuch as the latter will be tipped at such time I have provided a steering-head which correspondingly tips the head being connected, as will be described, with the steering-wheels. At the inner side of the dashboard $F^8$ and rigidly secured to the vehicle-body F, I have shown an upright standard $h$, Figs. 1, 5, and 7, provided at its upper end with a cap $h'$, through which is extended horizontally the shank $h^2$ of a collar $h^3$, the latter being free to rock on its horizontal shank, a suitable nut $h^4$ retaining the collar in place on the cap. Through the collar $h^3$ is rotatably extended a steering head or post H, (shown clearly in Fig. 7,) and made tubular and bent at its upper end to form an overhanging rearwardly-extending arm H', and provided above the collar with an annular flange $h^5$ and below the collar with a clamped ring $h^5$ to prevent longitudinal movement of the steering-head in the collar while permitting its rotative movement. The steering-head passes down between the dashboard and the front end of the vehicle-body, as best shown in Fig. 1, and at its lower end is entered by the stem $k$ of a T-shaped forging or foot, having a tubular and substantially-horizontal part $k^x$, the shank being preferably shouldered at $k'$, Fig. 21, to abut against the lower end of the steering-head, and, as shown by dotted lines in said Fig. 21, the latter is longitudinally slotted at its lower end, as at $H^x$. A split clamp-sleeve K embraces the end of the steering-head around the stem $k$ of the T-shaped member, and by tightening up the bolts 12, Fig. 2, of the sleeve the latter is firmly clamped upon the head and holds the T member or foot rigidly secured thereto. The tubular part $k^x$ of said foot is set in the upright plane of the overhanging arm H', and the forwardly-extended end of said foot is shown in Fig. 21 as somewhat longer than the rearwardly-projecting end. Plugs $m$ and $n$ are provided, respectively, at their outer ends with hollow bosses $m'$ $n'$, and the plugs are inserted into the part $k^x$ of the foot from opposite ends, the threaded reduced end $m^x$ of the one plug being screwed into a correspondingly-threaded recess in the inner end of the plug $n$ to thereby form a convenient and strong connection between the bosses $m'$ $n'$ and to at the same time hold them secured in place at the outer ends of said tubular part $k^x$ of the foot. Bushings $m^2$ $n^2$ are inserted in the bosses and are slightly longer than the latter, and through said bushings headed pivot-pins $m^3$ and $n^3$ are extended in parallelism with each other and ordinarily with the straight portion of the steering-head. The pivot-pin $m^3$ passes through the arms of a yoke $m^4$ on one end of a radius-bar $m^5$, and between the arms of the yoke and the ends of the bushing $m^2$ are interposed dust caps $m^6$, shown as disks having inturned annular flanges which extend over and embrace the ends of the boss $m'$. When the retaining-nut $m^7$ on the head pivot-pin $m^3$ is tightened up, the yoke-arms are clamped upon the dust-caps and the latter upon the ends of the bushing $m^2$, so that the bushing-pin, dust-cap, and yoke may rotate together in or upon the boss.

I prefer to connect the yoke $m^4$ and the radius-bar $m^5$ by a screw-threaded connection, as at $m^8$, Fig. 2, so that there may be a slight rotative movement of the bar relatively to the yoke when occasion arises in the operation of the vehicle. The other end of the bar $m^5$ is connected by a horizontal pivot $m^9$, Fig. 2, to one of the yokes $c^2$ on the front axle-frame.

Referring again to Fig. 21, a headed pivot-pin $n^3$ is extended through the arms of the yoke $n^4$ and through the bushing $n^2$, and dust-caps $n^6$, such as hereinbefore described, are provided, the nut $n^7$ clamping the dust-caps, yoke-arms, and pivot-pin to the bushing. The yoke $n^4$ (see Figs. 1, 3, and 6) is rigidly secured to a link $n^5$, the opposite end of the link being jointed to the connecting-rod $c^6$ between the wheel-controlling lever-arms $c^5$. Similar dust-caps $m^{69}$ and $n^{69}$ are interposed between the ends of the foot and the bosses $m'$ $n'$.

The joint I prefer to use is best shown in Fig. 6, wherein one of the clamps $c^{14}$ has erected upon it a sphere or ball $c^{14x}$ to coöperate with a suitable socket $n^{10}$, having a shank $n^9$, provided with a reduced threaded end $n^8$ to enter a correspondingly-threaded recess in the end of the link or rod $n^5$. The link and the connecting-rod $c^6$ are thus connected by a universal joint, and not only that, but by means of the connection between the socket-shank $n^9$ and the link a slight rotative movement of the link is permissible without any tendency of distortion or binding of the parts.

From the foregoing description it will be obvious that a rotative movement of the steering-head in its supporting-collar $h^5$ will operate to move the connecting-rod $c^6$ in one direction or the other. When the head is so rotated by swinging the overhanging arm H' to the right or left, the head as a whole also has a slight rocking movement on its horizontal supporting-fulcrum $h^2$, for it will be remembered that the bar $m^5$ is connected at its opposite ends to the front axle-frame and to the T-shaped foot at the lower end of the steering-head, and the said head will swing about the pin $m^3$ as a fulcrum, the radius-bar $m^5$ holding the latter stationary. The other pin $n^3$ will move in a small arc, but sufficiently to swing the steering-wheels in one direction or the other to properly guide the vehicle.

When the vehicle-body is rocked and depressed upon its springs, as by the weight of a person getting in or out, of course the steering-head will partake of the motion of the vehicle-body, and this motion is permitted and provided for by the horizontal joint $m^9$ and the ball-and-socket joint connecting the link $n^5$ and rod $c^6$, the links $m^5$ $n^5$ being substantially equal in length and the yoke ends thereof turning with the plugs $m$ $n$.

In practice I have found that the parts of a motor-vehicle, at the front and lower portion thereof, are the most subjected to the action of dust and dirt and are consequently more liable to rapid wear unless the entrance of dust is prevented, and I very effectually prevent its entrance by means of the dust-caps $m^6$, $n^6$, $m^{69}$, and $n^{69}$, heretofore described, and by the general construction of the parts described.

When a person gets into or out of the vehicle-body, and thereby tips the latter, such movement is provided for, so far as the steering-head is concerned, by the horizontal fulcrum $h^2$ of the latter and by the pivotal connections of the rods $m^5$ $n^5$, although even with a heavy person the upper end of the steering-head will be swung in such manner only a few inches.

If the steering-head had no rocking movement whatever on its fulcrum $h^2$, the overhanging arm H' would travel from right to left in steering the vehicle in a plane nearly at right angles to the straight portion of the head; but as the head as a whole has a slight rocking motion on its horizontal fulcrum the overhanging arm will travel in a path which is very slightly concaved; but it travels in a single path.

Any suitable motor may be employed, either steam, electric, or otherwise; but whatever the character of the motor it is highly desirable that the operator may absolutely control the same as to its speed and direction of movement—that is to say, to go ahead or to reverse—with the smallest number of parts to be handled, and I have in this invention devised controlling means for the vehicle by which it is not only steered but governed as to its speed and its forward or backward movement, said controlling means requiring for its operation only one of the operator's hands. The motor herein shown is a steam-motor, comprising a boiler M and a hood or jacket M', Fig. 1, surrounding the cylinders and valve-chests of the engine, which latter is mounted on the boiler, and the general construction and arrangement of the parts of the boiler and engine or motor proper may be and are substantially as shown and described in my application referred to, and while a steam-motor is herein shown for furnishing the propulsive power of the vehicle it will be obvious that any other suitable motor may be used without departing from the spirit and scope of the invention.

Referring now to Fig. 1, the steam passes from the steam-space of the boiler by pipe $m^{20}$ to a throttle arranged within a shell or chest $m^{21}$, and from the throttle the steam passes to the valve-chests by a pipe $m^{22}$. The throttle-valve itself (not shown and which may be of any desirable construction) has its stem $t$ extended through the chest $m^{21}$ and jointed to an arm $t'$ of a rock-shaft $t^2$, having its bearings in one of the transverse motor-supports $M^x$, to be hereinafter described, the said rock-shaft having also a downturned arm $t^3$, connected, as is shown in Fig. 4, by a link $t^4$ with an arm $t^5$ on a long shaft $t^6$, having at its inner end a bearing at $t^7$, Fig. 1, and at its outer end a pinion $t^8$, fast thereon, the shaft passing through the divided supporting-arm $t^9$, (see Fig. 10,) depending from a collar $t^{10}$, through which the steering-head H passes loosely, retaining-rings $t^{12}$ being secured to the head above and below the collar $t^{10}$ to prevent vertical movement of the collar relatively to the steering-head, the pinion $t^8$ being shown as fast on the shaft between the parts of the supporting-arm $t^9$. Inasmuch as there is a slight swinging movement to the lower end of the steering-head, I prefer in order to avoid any twisting or cramping of the speed-controlling rock-shaft $t^6$ to have the bearing $t^2$ swivel-mounted. The steering-head opposite the pinion $t^8$ is cut away at one side, as at $h^{12}$, and inside of the head, preferably opposite said opening, as best shown in Fig. 10, I have secured a plate $h^{13}$, having inturned ends $h^{14}$, which are recessed at their outer ends to partially embrace a shaft $H^2$, extended part way through the straight portion of the steering-head H and concentric therewith. The parts $h^{14}$ form upper and lower bearings for an exteriorly and coarsely threaded sleeve $h^{15}$, (shown separately in Fig. 13,) the shaft $H^2$, passing through the sleeve, being longitudinally movable therein, but connected to said sleeve $h^{15}$ to rotate it by means of a spline or key 25, Figs. 11 and 12, entering a suitable longitudinal keyway or groove 26 in the shaft. The threaded sleeve $h^{15}$ passes through and engages the similarly-threaded opening $h^{16}$ of a substantially cylindrical block $h^{17}$, which is elongated at one side, as at $h^{18}$, Fig. 12, to extend into and be guided by the opening $h^{12}$ in the steering-head. The part of the block extended through the opening in the head is shown herein as provided with a recess to receive a lug $h^{19}$ on a two part collar $h^{20}$, $h^{21}$, which loosely surrounds the steering-head, and on the part $h^{21}$ of the collar are formed a series of long curved rack-teeth $h^{22}$, with which the teeth of the pinion $t^8$ mesh. Now if through rotation of the shaft $H^2$ the threaded sleeve $h^{15}$ is rotated in one or the other direction the block $h^{16}$ will be raised or lowered, and thereby the segmental rack-teeth $h^{22}$ will be raised or lowered to thereby rotate the pinion $t^8$ in one direction or the other. Such rotative movement of the pinion more or less rotates the shaft $t^6$ and through the connections described operates the throttle to open or close the same or move it to some intermediate position. The long rack-teeth provide for continuous engagement with the pinion $t^8$ when the steering-head is partially rotated, and the collar $h^{20}$ $h^{21}$ is made in two parts for greater convenience and ease in assembling the various members of the mechanism. When the shaft $H^3$ is moved longitudinally, the threaded sleeve $h^{15}$ will not be rotated, and consequently the vertical position of the block $h^{16}$ will not be altered.

The end of the overhanging arm H' is provided with a bearing-cap $H^5$ for a rotatable and longitudinally-movable shaft or rod $H^6$, provided with a suitable handhold or grip $H^7$, the inner end of the member $H^6$ having an enlargement 23 to snugly fit the interior of the overhanging arm and to guide said member $H^6$ in its rotative or longitudinal movement. Between the member $H^6$ and the upper end of the shaft $H^8$, which latter is also provided with an enlargement 24 to guide it in its movements, (see Fig. 7,) I have interposed a flexible connection which will conform to the curvature of the steering-head, while it will transmit rotative or longitudinal movement of the member $H^6$ to the shaft $H^8$. In Fig. 7 the connection is shown as a flexible shaft $H^{10}$, attached at its ends to the slide-rod $H^6$ and the shaft $H^8$, respectively, said flexible shaft being composed of a series of conical spirals wound in opposite directions, and, as best shown in Figs. 8 and 9, four such spirals are shown, 16, 17, 18, and 19, the spirals 16 and 18 being wound in one direction and the spirals 17 and 19 in the opposite direction, so that when the flexible shaft thus formed is turned in one direction alternate spirals will be tightened and the intermediate ones expanded, and when turned in the opposite direction the previously-expanded spirals will be tightened and the previously-tightened ones expanded. A very strong, serviceable, and flexible shaft or connection is thus provided, and it conforms itself readily to the curvature of the steering-head between the upright portion thereof and the overhanging arm.

It will be obvious that the operator by grasping the handhold $H^7$ cannot only swing the overhanging arm of the steering-head to the right or left to steer the vehicle, but he can at any point in the lateral path of movement of the arm rotate the slide-rod $H^6$ by a turn of his wrist to thereby effect rotative movement of the upright shaft $H^8$ and through the connections hereinbefore described open or close the throttle, according to the direction of rotative movement, or adjust the throttle-opening between opening and closing to thus govern absolutely and instantly the speed of the motor, and consequently that of the vehicle, at all times. In the construction herein shown rotative movement of the slide-rod to the right will cut off the steam from the motor, while movement to the left opens the throttle.

It is convenient to provide means for automatically applying the brake when the steam is shut off from the motor, and to effect this I have mounted a brake-controlling cylinder $b^{45}$ on the vehicle-body, Figs. 1 and 7, connecting the piston thereof by a rod $b^{46}$ with the foot-actuated brake-controlling lever 9. The cylinder is provided with a suitable valve-chest $b^{47}$, connected by a pipe $b^{48}$ with the steam-space of the boiler and having an exhaust $b^{49}$. Referring to Fig. 4, the valve-rod $b^{50}$ is connected to one arm of a bell-crank lever $b^{51}$, (shown in dotted lines,) the other arm of the lever being acted upon by a spring $s^{20}$ to normally retain the parts in the position shown in said Fig. 4. A link $b^{52}$ is attached by a slot-and-pin connection to the spring-controlled arm of the lever $b^{51}$, the other end of the link being jointed to a rocker-arm $b^{53}$, fast on the rock-shaft $t^6$. When the latter is rotated in the proper direction to shut off the steam from the motor, the valve-rod $b^{50}$ will be moved to admit steam to the brake-cylinder $b^{45}$ to thereby set the brake, and when the rock-shaft $t^6$ is turned to open the throttle the valve-stem $b^{50}$ is moved to permit the escape of steam from the brake-cylinder to thereby release the brake.

In Fig. 14 I have shown a modified form of flexible connection between the slide-rod $H^6$ and the shaft $H^8$, said connection comprising a series of links 66, connected to each other by gimbal-joints at 67, to permit the rotative movement of said connection and also the adaptation thereof to the curvature of the steering-head, the end links of the connection being attached, respectively, to the slide-rod $H^6$ and shaft $H^8$.

In order to effect complete control of the vehicle, it is also necessary that the operator should be able to at all times reverse the direction of movement of the vehicle, not only to avoid accident, but also to provide for backward movement of the vehicle at times. In my present invention I control such forward or backward movement of the vehicle by longitudinal movement of the slide-rod $H^6$, and it therefore follows that the direction of movement of the vehicle is under the absolute control of the operator's hand, and not only that but at any point in the path of movement of the overhanging arm in the steering-head, so that whether the vehicle is going on a straight line or on a curve it may be started, stopped, or its direction of movement reversed instantly and at the will of the operator.

The main crank-shaft $M^{12}$ of the motor, Fig. 1, is connected to the valve-shaft $M^{13}$, and by means of a suitable device—such, for instance, as shown in United States Patent No. 478,022, dated June 28, 1892—the direction of rotation of the main and valve shafts will be reversed. A bracket $m^{40}$ is shown as mounted on the lower portion of the boiler and has fulcrumed thereon at $m^{41}$ a bell-crank lever $m^{42}$, one arm of which is connected with the reversing device for the motor, the other arm being connected by a link $m^{43}$ with a rocker-arm $m^{44}$ on a rock-shaft $m^{45}$, supported at one end in a bearing $m^{46}$ on the boiler, as shown in Fig. 1, the other end of the rock-shaft having its bearing in ears $m^{47}$, (see Fig. 20,) forming part of a collar $m^{48}$, loosely surrounding the steering-head below the bottom of the vehicle-body and held in place thereon by retaining-rings $m^{49}$, suitably secured to the head. The ears $m^{47}$ project laterally from the head, as clearly shown in Fig. 2, and between said ears is fixedly mounted on the rock-shaft, as by a set-screw $m^{50}$, Fig. 20, a rocker-arm $m^{51}$, having a laterally-extended, segmental, and bifurcated end $m^{52}$, Figs. 19 and 20, extended part way into the steering-head through an opening 89 made therein to engage a ball-like portion $m^{53}$ of a sleeve $m^{54}$, rigidly secured to the lower end of the shaft $H^8$ by a suitable set-screw $m^{55}$. The collar $m^{48}$, surrounding the steering-head, is also cut away opposite the opening 89 in the steering-head to permit free play of the rocker-arm $m^{51}$. Now when the slide-rod $H^6$ is drawn outwardly by the operator the shaft $H^8$ will be lifted, and through the joint between the sleeve $m^{54}$ and the rocker-arm $m^{51}$ the latter will be rocked to turn the shaft $m^{45}$ in the direction of the arrow 45, Fig. 20. By reason of the extended bifurcated end of the rocker-arm $m^{51}$ the rounded portion of the sleeve $m^{53}$ will at all times remain in engagement with the segmental portion $m^{52}$, no matter how much or how little the steering-head may be turned on its vertical axis in the steering of the vehicle.

The outward movement of the slide-rod $H^6$, hereinbefore referred to, will through the intervening connections reverse the direction of rotation of the motor, the normal or "go-ahead" position of the slide-rod being shown in Figs. 1 and 7.

So far as I am aware it is broadly new to provide controlling means for a vehicle whereby the latter is steered by a controlling member movable in a lateral path and to reverse the motor or control the speed of the vehicle at any point in the path of movement of the steering member by or through different movements of the hand of the operator in said path.

Referring to Figs. 3 and 4, the side bars $f^{50}$ of the vehicle-body have rigidly attached thereto transverse braces $f^{51}$, preferably made as tubes flattened at their ends, as at $f^{52}$, and bolted or otherwise suitably secured to the side bars, the transverse braces being connected near one side of the vehicle by a brace-bar $f^{53}$. Upon the cross-bars $f^{51}$ and brace $f^{53}$ I have mounted brackets $f^{54}$ and $f^{55}$, the horizontal foot of each bracket being secured to its supporting-bar by suitable screw-bolts, as 75, extended through holes in the brackets. The upturned flanges 77 78 of the several brackets are curved to embrace the boiler-shell, to which they are riveted in any suitable manner. By removing the bolts 75 the boiler and its attached motor can be removed bodily from the vehicle-body. The motor is thus supported upon the vehicle-body to move therewith, and it is preserved from shock and jar by the body-springs, and, as shown in Fig. 1, the motor and boiler are located under the central raised portion of the vehicle-body, and the parts are so compactly arranged that the bottom of the boiler extends but slightly below the vehicle-frame under normal conditions.

Inasmuch as the rear axle is considerably below the plane of the vehicle-frame and inasmuch as I desire to connect the driving-shaft of the motor as directly as possible to the rear driving-shaft of the vehicle without extending any of the motor mechanism unduly below the vehicle-frame, I have mounted the motor on the boiler at an inclination to the vertical axis thereof to thereby bring the motor crank-shaft $M^{12}$ into such position that its longitudinal axis, if extended, would intersect the longitudinal axis of the compound driving-shaft. This arrangement of the motor relatively to the boiler is clearly shown in Fig. 1.

Inasmuch as the motor is mounted on the spring-supported vehicle-body to move therewith and the driving-axle is mounted upon and to move with the vehicle-frame, it is necessary to provide such a connection between the crank-shaft of the motor and the driving-axle as will permit such relative movement of the vehicle-body and vehicle-frame without straining or distorting the parts. In other words, the connection must possess a certain flexibility not only transversely, but in the direction of its length, while at the same time affording a positive connection between the motor and driving-axle. The connection as herein shown comprises a shaft $o$, forked at its rear end, as at $o'$, to receive a pivot-pin $o^2$, on which is rotatably mounted a sleeve $o^3$, having lugs $o^4$ at right angles to the pivot $o^2$ and extended into the forked or bifurcated end $b^{76}$ of the pinion-shaft $b^{15}$, hereinbefore described. The other end of the shaft $o$ has secured thereto a cap $o^5$, having ears $o^6$, through which a pin $o^7$ is extended, said pin having fulcrumed thereon like arms $o^8$, which carry at their extremities socket members $o^9$ to receive the ball-like ends $o^{10}$, Fig. 1$^b$, of two arms $o^{12}$, pivoted on a double-headed pin $o^{13}$, parallel to the pin $o^7$, and supported in a forging $o^{14}$, the forging being substantially yoke-shaped and forming half of the bearing at each end of the pin $o^{13}$, removable caps $o^{15}$, bolted to the forging, retaining the pin in place. The forging $o^{14}$ is securely attached to the motor-shaft $M^{12}$.

From the foregoing description it will be obvious that the connection between the motor-shaft and driving-axle can swing at one end either about the fulcrum $o^2$ or about the fulcrum $o^4$ at right angles thereto, and a second double or gimbal joint is formed at the other end of the shaft $o$. By the construction of this latter joint described the distance between the end of the motor-shaft and the pinion-shaft $b^{15}$ can be varied, as the pivotally-mounted arms $o^8$ and $o^{12}$ will permit increase or decrease of such distance without at all affecting the positive connection between the shafts $M^{12}$ and $o$.

While the vehicle-body will tip when a person gets in or out, and while it will have different movements on its springs relatively to the vehicle-frame, such tipping or other movement of the body will in no wise disarrange or distort the positive connection between the motor and driving-axle of the vehicle.

While I have herein shown a steam-motor, it will be obvious that any other desired or suitable form of motor may be employed, and the connection between the motor and driving-axle may be substantially the same as herein shown and described. So, too, the speed-controlling device herein shown could of course be applied to any other form of motor. As, for instance, with an electric motor it will be obvious that a rheostat or other resistance device could be readily arranged to be operated by the speed-controlling device herein shown.

I have found in practice that a steam-motor is for many reasons very desirable for use with motor-vehicles, and I have herein shown several features in connection with such a motor which properly apply to its adaptation for use with motor-vehicles.

The boot $F^{80}$ of the vehicle has therein a tank $F^{31}$, divided by a double transverse wall $F^{82}$, leaving an air-space between, and the parts of the tank on opposite sides of the double wall are connected by a pipe having a suitable check-valve $F^{33}$ therein, Fig. 4, which will permit the passage of the water for the boiler which is to be stored in the tank from the rear to the forward compartment. The rear compartment has mounted therein a preferably cylindrical tank T for naphtha or other liquid fuel, and the water in the compartment will more or less surround or submerge the fuel-tank, and it will be seen that the tank is removed as far as possible from the boiler and that the great body of water is interposed between the tank and boiler to increase the safety of the apparatus.

One of the principal objections to the use of steam as the motive power for motor-vehicles has heretofore been the cloud of escaping steam caused by the exhaust, especially in cold weather; but I have devised means whereby the exhaust-steam is so condensed before its final escape that there is no visible vapor therefrom even in cold weather. In this connection it may be stated that in warm or temperate weather the exhaust is hardly noticeable in my apparatus, even if no condensing apparatus is used; but when the temperature is below 60° Fahrenheit, or thereabout, the formation of vapor increases as the temperature decreases. The exhaust-steam from the motor passes by means of a pipe $m^{90}$ to a chamber $m^{91}$, which is filled, preferably, with fibrous material—such, for instance, as curled hair—to act as a muffler for the steam, acting to prevent the escape thereof in distinct puffs and deadening the noise. From the muffler the steam is conducted to a pipe $m^{92}$, which, as shown in Fig. 4, may be arranged in a series of bends on or beneath the floor of the vehicle-body, the number and location of the bends depending upon the length of pipe through which it is desired the exhaust-steam shall pass. The pipe continues from the bends and is extended into the front compartment of the tank $F^{31}$, where another series of bends $m^{93}$ is formed, preferably lengthwise of the compartment, from which latter bends a pipe $m^{94}$, forming a continuation of said bends, passes out of the tank. A flexible pipe $m^{95}$, connected to the pipe $m^{94}$, leads to a coupling $m^{96}$ on the cross-bar $a^3$ of the vehicle-frame. (See Fig. 23.) The coupling is connected by branches $m^{97}$, which are carried outwardly and down at the inner sides of the rear wheels B B$^\times$, and the extremities of these branches, which are in themselves near the ground, have preferably applied thereto flexible sections of pipe $m^{98}$, which are carried as closely as possible to the plane of the wheel-base. The exhaust-steam passing through the bends under the floor of the body is partially condensed and in passing through the bends $m^{93}$ will be still further condensed, the heat given up being absorbed by the water in the tank, so that the latter is heated before it is introduced into the boiler by a suitable pump. Thus the steam will have been so condensed that the final escape at the ends of the branches adjacent the rear wheels will cause no visible vapor. Should there be a slight amount of visible vapor in the coldest weather, it will be discharged so near the ground that it will mix with the dust raised by the wheels and will be unnoticed.

The check-valve $F^{23}$ permits the water to pass from the rear compartment to the front compartment of the tank $F^{31}$, but will not allow passage of the water in a reverse direction, so that the water in the compartment containing the fuel-tank T will not be heated to any undesirable degree.

In warm weather it is desirable to turn the exhaust directly into the stack $M^{79}$ of the boiler, (see Fig. 4,) and I have accordingly connected the stack with the pipe $m^{92}$ by a branch pipe $m^{100}$, a suitable valve $m^{101}$ controlling the passage of the exhaust-steam.

I may conveniently employ a three-way valve, which will permit all the exhaust-steam to pass through the condensing apparatus for use in cold weather or to pass entirely into the stack in warm or hot weather or to divide the exhaust, some of it passing to the stack and some to the condenser, in cool weather.

It is very desirable that the operator should know at all times the amount of water in the tank $F^{31}$, and I have shown a convenient indicating device for this purpose. A float P (see dotted lines, Fig. 4) is mounted on a lever $p$ within the forward compartment of the tank and secured to a rock-shaft $p'$, extended through the front wall of the tank and provided at its outer end with a rocker-arm $p^2$. A shaft $p^3$ is mounted at its rear end in a bearing $p^4$ on the vehicle-body, preferably beneath the floor thereof, and is supported at or near its front end in a bearing $p^5$ near the dashboard. At its rear end said shaft has fast thereon a rocker-arm $p^6$, connected with the rocker-arm $p^2$, and a second rocker-arm $p^7$ at the front end of the shaft has jointed to its outer end a link $p^8$, which has its upper end bent over and extended through a slot $p^9$ in a vertical scale $p^{10}$, secured inside of the dashboard, the bent portion of the link being shaped to constitute a pointer $p^{12}$ (see Fig. 5) to coöperate with the scale. When the tank is full, the pointer will be at the top of the scale, and the decrease of water in the tank will be clearly indicated to the operator by the fall of the pointer along the scale.

In Figs. 15 to 18, inclusive, I have shown a modified form of controlling means for the vehicle, which will now be described. The vehicle-body is provided with an upright tubular standard R, having a longitudinal slot $r^\times$, through which is extended the eyebolt $r$, the eye of which is threaded and engaged by the threaded end of a link $r'$, extending through an opening 62 in the floor of the vehicle and connected by a rocker-arm $r^2$ (shown in section, Fig. 15) with the rock-shaft $l^6$, (not shown in Fig. 15,) and hereinbefore described, for controlling the speed of the motor. The steering-head $R^\times$ is supported, as hereinbefore described, by the standard R, and it is free to rock on its horizontal fulcrum $v$ while rotatable in the collar $v'$, said steering-head having an overhanging arm R', provided at its end with a cap $R^2$, which forms a bearing for a tubular sliding member $R^3$, having a handhold $R^4$. The member $R^3$ has loosely surrounding it at its inner end a collar $r^3$, cut away at its top to clamp a longitudinal key $r^4$, attached to the interior of the overhanging arm at its upper side, said key passing through a keyway $r^5$ in a cylindrical block $r^6$, into which the inner end of the member $R^3$ is extended and secured by a screw $r^7$. The collar $r^3$ is located between the block and a ring $r^8$, fast on the member $R^3$, Fig. 15, so that when the latter is drawn out or to the right the block, collar, and ring will move with it, the collar having ears $r^9$ extended through a longitudinal slot or opening $r^{10}$ in the under side of the overhanging arm. When the sliding member $R^3$ is in the position shown, the block $r^6$ is beyond the key $r^4$, and when fully drawn out the block will be beyond the other end of the key, so that the member $R^3$ can when in either extreme position be rotated in the sleeve $r^3$. The ears $r^9$ of the sleeve have pivotally connected with them one member $r^{12}$ of a socket, the other member $r^{13}$, Fig. 16, screwing thereon and adapted to inclose the ball-like end $r^{14}$ of a connecting-rod $r^{15}$, forked at its lower end to engage fulcrum-studs $r^{16}$ on a collar $r^{17}$, surrounding a long sleeve $R^5$, loosely surrounding the standard R. For convenience in applying the sleeve to the standard I make it in halves longitudinally separable and threaded at $r^{18}$ and $r^{19}$ to receive retaining-collars $r^{21}$ $r^{91}$, which hold the parts of the sleeve in place. The sleeve has a boss $r^{20}$ thereon, through which the eyebolt $r$ is extended and held in place by a suitable nut $r^{21}$, the sleeve being long enough to cover the slot $r^\times$ in the standard whether the sleeve is moved up or down. By drawing the sliding member $R^3$ out relatively to the overhanging arm $R'$ the sleeve $R^5$ is raised, and with it the link $r'$, to thereby operate the reversing mechanism of the motor. When the parts are in the position shown in Fig. 15, the motor would be ready to go ahead in accordance with the present construction. The arm $R'$ in the bent portion is provided with an elongated bearing $w$ for a rock-shaft $w'$, having a keyway $w^2$ to be entered by a fin $r^{30}$ on the end of the block $r^6$, through which the shaft passes into the sliding member $R^3$. At its outer end beyond the bearing $w$ the shaft has a crank-arm $w^4$ fast thereon, the crank-pin $w^5$ entering a cam-slot $w^6$ in the head of a vertically-movable rod $w^7$ in the steering-head, connected at its lower end, as described and as shown in Fig. 20, with the shaft $m^{45}$, which controls the speed of the motor. Rotative movement of the slide member $R^3$ will, acting through the block $r^6$, rock the shaft $w'$ to thus regulate the speed of the motor, and as the member $R^3$ can be rotatively moved only when in extreme positions, forward or back, it follows that regulation of the speed of the motor can only be effected when the motor is going ahead or backward. When it is desired to change the direction of rotation of the motor, the member $R^3$ must be rotated to shut off the motive power first, thereby bringing the keyway $r^5$ in position to admit the key $r^4$, the ends of the latter being preferably rounded to facilitate its entrance into the keyway. The cam-slot $w^6$ is shaped to depress the rod $w^7$ when the pin $w^5$ engages the horizontal part thereof in turning to the right viewing Fig. 22. I have provided means for setting the brake when the power of the motor is shut off, the stem $b^{50}$ of the controlling-valve for the brake-cylinder $b^{45}$ being connected with the short arm $s^8$ of a bell-crank lever, Fig. 15, fulcrumed on a bracket $s^9$. The long arm $s^{10}$ of the lever is connected to the lower end of a link $s^{12}$, extended upward near the steering-head and having a cam-slot $s^{13}$ in its upper end, through which the wrist-pin $w^5$ is extended. This cam-slot is arranged reversely to the slot $w^6$, so that when the rod $w^7$ is depressed the pin $w^5$ will simply travel in the downcurved part of the groove $s^{13}$ and the brake mechanism will remain inoperative. When the rod $w^7$ is raised as far as it will go by the wrist-pin, further movement of the latter to the left will be in the downcurved part of the slot $w^6$, not effecting any change in the position of the rod; but at such time the straight part of the slot $s^{13}$ will be acted upon by the pin to thereby depress the link $s^{12}$ and operate to set the brake. The curved portions of the two cam-slots are concentric with the circular path of the wrist-pin.

In this invention I have shown the rotative movement of the sliding member of the vehicle-controlling means as adapted to govern the speed of the vehicle and the longitudinal movement of such member to govern the direction of movement of the vehicle either forward or back, either or both of said movements being effected by the operator while the overhanging arm of the steering-head is at any point of its single path of movement; but it will be obvious that the speed may be controlled by longitudinal movement and the reversing mechanism by rotative movement of the sliding member carried by the steering-head and forming a part of the vehicle-controlling means, so that my invention is not restricted to either construction; nor is my invention restricted to the precise construction, arrangement, and operation herein shown and described, for the same may be varied in different particulars without departing from the spirit and scope of my invention.

Inasmuch as it is desirable to vary the power of the motive mechanism at times—as, for instance, when traveling in hilly country—far greater power is obviously necessary when mounting a hill than when running over level ground, and by the mechanism herein shown the speed of the vehicle may be varied without necessarily varying the speed of the motor. Of course the increase of power is effected at the expense of the speed of the vehicle, and vice versa; but the constant change of motor-speed is obviated by the power-varying device. In Fig. 24 I have shown such device as introduced into and forming a part of the power-transmitting connections between the motor and the driving-axle of the vehicle, the shaft $o$, Fig. 1, being shortened to admit the introduction of the said device between the pinion $b^{16}$ and the joint connecting its shaft $b^{15}$ with shaft $o$. Referring to Fig. 24, the shaft $b^{15}$ is shown as made longer than in Fig. 1, passing through a bearing $b^{100}$, which may form a part of or be attached to the bracket $B^2$, a bevel-gear $b^{101}$ being rigidly secured to the said bearing $b^{100}$. A similar gear $b^{102}$ is keyed to a shaft $B^{88}$, which latter is shown as cored out to receive the end of the pinion-shaft $b^{15}$, the shaft $B^{83}$ being connected to the motor in place of the shaft $o$, Fig. 1, or it may be connected with the rear end of the latter shaft by a joint. A spider $b^{103}$ is rotatably mounted on shaft $b^{15}$, between the bevel-gears $b^{101}$ and $b^{102}$, said spider, as herein shown, carrying studs $b^{104}$, four in number, on each of which is rotatably mounted a bevel-pinion $b^{105}$. A disk $b^{106}$, adjacent the back of the gear $b^{102}$, has an annular flange $b^{107}$, which passes around the outer ends of the pinions $b^{105}$, the studs $b^{104}$ extending through the flange, the latter being secured thereto by suitable bolts 125, so that when the gear $b^{102}$ is moved longitudinally of the shaft $B^{83}$ the disk, spider, and pinions will move in unison therewith. The hub of the bevel-gear $b^{102}$ is enlarged interiorly to receive the hub of a clutch member $C^{65}$, surrounding the hollow end of and attached to the shaft $B^{84}$ in suitable manner to rotate therewith, said clutch member having a series of projections $c^{65}$ on its inner face. A second clutch member $C^{66}$ is secured to the shaft $b^{15}$, between the spider and the gear $b^{101}$, said member having inturned projections $c^{66}$, which enter correspondingly-located holes $b^{108}$ in the spider $b^{103}$, the holes and the projections on the two clutch members being located in like circles on the respective parts. Now with the parts in the position shown in Fig. 24 rotation of the shaft $B^{83}$ carries the bevel-gear $b^{102}$ around with it, causing axial rotation of the pinions $b^{105}$ on their studs, and as the fixed bevel-gear $b^{101}$ meshes with said pinions they will cause the spider $b^{103}$ to rotate at one-half the speed of the shaft $B^{83}$. Through the clutch member $C^{66}$ the spider transmits its rotation to the shaft $b^{15}$ and at the same speed, so that differential speed of shafts $B^{83}$ and $b^{15}$ is effected. If, however, the gear $b^{102}$ is moved on the shaft $B^{83}$ to the left, Fig. 24, the pinions $b^{105}$ will be disengaged from the fixed gear $b^{101}$ and the spider will be moved toward the clutch member $C^{65}$ until the projections $c^{65}$ thereof enter the holes $b^{108}$ of the spider. Such movement of the spider will not disconnect it from the clutch member $C^{66}$ because of the length of the projections $c^{66}$, and thus the spider acts to connect said two clutch members, and they will rotate together and at the same speed. It therefore follows that the shafts $B^{83}$ and $b^{15}$ will rotate together and at the same speed, each clutch member being connected to rotate with its particular clutch member, as described. The hub $b^{109}$ of the bevel-gear $b^{102}$ is shown as provided with an annular groove $b^{112}$ to receive lugs on a controlling-lever, as $b^{113}$, or other device, by which the mechanism may be controlled by the occupant of the vehicle.

From the foregoing it will be clear that while the speed of the motor may be constant, driving the shaft $B^{83}$ at uniform speed, the pinion-shaft $b^{15}$ may be rotated at the same speed as or more slowly than the shaft $B^{83}$, thus providing for variations in power as desired.

The construction illustrated is simple and strong, and one shaft tends to support and strengthen the other; but it is not necessary to make one shaft enter the other, and consequently I do not restrict myself to the construction shown herein.

Having described my invention, what I claim, and desire to secure by Letters Patent, is—

1. In a road-vehicle, propulsion devices, steering, speed-regulating, and reversing mechanisms, a manually-operated controller for the vehicle, controlling means intermediate said manual controller and said mechanisms, said controller having a main swinging movement and auxiliary independent rotative and longitudinal movements, whereby the several mechanisms are governed as to their operation by the different movements of the controller.

2. In a road-vehicle, propulsion devices, steering, speed-regulating, and reversing mechanisms, a common, manually-operated controller for the vehicle, operating connections between the controller and said mechanisms, the said controller having a lateral movement to steer the vehicle, and also having auxiliary independent rotative and longitudinal movements in the path of lateral movement, one of said auxiliary movements governing the speed-regulating mechanism, the other auxiliary movement governing the reversing mechanism.

3. A road-vehicle having steering and propelling mechanisms, speed-regulating and reversing devices for the latter, and controlling means for the vehicle, including a manually-operated member laterally movable in a single path to steer the vehicle, said member being also capable of rotative and longitudinal movement in and at any part of said path, to vary the speed of and to reverse the direction of movement of the vehicle.

4. In a road-vehicle, propelling mechanism and devices for regulating the speed of and reversing the same, and steering mechanism for the vehicle, including a steering-head, combined with a hand-actuated controlling member, a support therefor rigidly mounted on said head and movable laterally by corresponding movement of said member to steer the vehicle, said controlling member having also two independent auxiliary movements in the plane of said support, and connections between said member and the speed-regulating and the reversing devices, to operate the said devices by the auxiliary movements of the controlling member to thereby regulate the speed and reverse the direction of movement of the vehicle.

5. In a road-vehicle, propulsion devices, steering and braking mechanisms, a steering-lever constructed and arranged to be moved in a lateral path to steer the vehicle, a handle mounted on said steering-lever, and controlling means intermediate said handle and the propulsion devices and braking mechanism, said handle having a plurality of auxiliary movements to independently control the propulsion devices and braking mechanism.

6. In a road-vehicle, propelling mechanism, speed-regulating and reversing devices therefor, a hollow steering-head for the vehicle, having an overhanging arm at its upper end, a rotatable and longitudinally-movable member mounted in said head, independent connections between said member and the speed-regulating and reversing devices, a hand-controller carried by the overhanging arm and adapted to be rotated and longitudinally moved, and connected with said member, to operate the latter in conformity with the movement of the hand-controller.

7. In a road-vehicle, propelling mechanism, speed-regulating and reversing devices therefor, a steering-head for the vehicle, and a two-part overhanging arm on the head, one of said parts being rotatably and longitudinally movable relatively to the other part, combined with independently-operative connections between the speed-regulating and reversing devices and the relatively-movable member of the overhanging arm, to be controlled by movement of the latter.

8. In a road-vehicle, propelling mechanism having speed-regulating and reversing devices, a steering-head for the vehicle, having an overhanging arm adapted to be swung laterally, a rotatable, manually-controlled member mounted to slide longitudinally on said arm, connections between said member and the speed-regulating device, to operate the latter by rotation of the member, and connections between the latter and the reversing device, to be operated by a longitudinal movement of the said manually-controlled member.

9. In a road-vehicle, propelling mechanism, speed-controlling and reversing means therefor, steering mechanism including a steering-head, a laterally-movable, manually-operated controller mounted on said steering-head, and adapted to be longitudinally and torsionally movable relative thereto, and independently-operative connections between the controller and said speed-controlling and reversing means, the controller being movable laterally to steer the vehicle, longitudinally at any point in its lateral path to operate the reversing mechanism, and torsionally at any point in said path to actuate the speed-controlling means, to thus start, stop or vary the speed of the vehicle while moving either forward or back in any direction.

10. In a road-vehicle, propelling mechanism, a reversing device therefor, steering mechanism, a two-part overhanging extensible arm connected with said steering mechanism and movable laterally in substantially a single plane, to steer the vehicle, the extensible part of said arm being connected with said propelling mechanism and reversing device and operative independently at any point in the path of lateral movement without departing therefrom, to control said propelling mechanism and its reversing device respectively.

11. In a road-vehicle, propelling mechanism, speed-regulating and reversing means therefor, brake mechanism, steering mechanism to steer the vehicle, a laterally-movable, extensible hand-controller, and connections between it and said brake and steering mechanisms, speed-regulating and reversing means respectively, said hand-controller being adapted to be swung laterally to steer the vehicle and to be moved longitudinally and rotated at any point in its lateral path to operate the speed-regulating and reversing means, to thereby start, stop and control the speed and reverse the movement of the vehicle, one of the latter two movements controlling the speed and the other the reversing and propelling mechanism, prolongation of one of such movements also operating the brake mechanism.

12. In a road-vehicle, propelling mechanism, speed-regulating and reversing means therefor, steering mechanism to steer the vehicle, a laterally-movable, extensible, rotatable hand-controller, and connections between it and said steering mechanism, speed-regulating and reversing means, respectively, said hand-controller being adapted to be swung laterally to steer the vehicle, and to be moved longitudinally and rotated at any point in its lateral path, to operate the speed-regulating and reversing means, to thereby start, stop, control the speed and reverse the movement of the vehicle, one of the latter two movements controlling the speed and the other reversing the propelling mechanism.

13. In a road-vehicle, propelling mechanism and means for controlling the same, steering mechanism, a laterally-movable, extensible, rotatable hand-actuated controller connected with said steering mechanism and adapted to be swung laterally to steer the vehicle, connections between said hand-controller and said propulsion-controlling means, whereby a longitudinal or rotative movement of said hand-controller at any point in its path of lateral movement will operate said propulsion-controlling means and thereby start, stop, reverse and vary the speed of the vehicle.

14. In a road-vehicle, wheels, a body yieldingly connected therewith, steering mechanism, including a steering-head, a support for the latter, on said body, provided with a bearing in which the head is rotatively suspended, said bearing also providing a fulcrum on which the head is adapted to rock.

15. In a road-vehicle, wheels, a body yieldingly connected therewith, a steering-head, a support therefor carried by the body, and a connection between said support and head, whereby rotative and rocking movement of the latter is permitted and provided for.

16. In a road-vehicle, steering and running wheels, a body yieldingly connected therewith, a steering-head supported by the body and capable of rotative and rocking movement, and means independent of the body and intermediate the head and steering wheel or wheels, to position the lower end of the steering-head and guide the vehicle through rotative movement of the head, while permitting the latter to adapt itself to relative movement of the body and wheels.

17. In a road-vehicle, wheels, a body yieldingly connected therewith, steering mechanism, a rotatable steering-head suspended on said body and having a rigidly-attached foot at its lower end, a vertically-movable fulcrum for said foot, and a vertically-movable connection between the eccentric end of said foot and said steering mechanism.

18. In a road-vehicle, wheels, a body yieldingly connected therewith, a rotative steering-head carried by the body, a positioning device for the lower end of the head, independent of the body and providing a vertically-movable fulcrum about which said lower end of the head moves, steering devices for the vehicle, and connections between said devices and the head, whereby rotative movement of the latter will operate to steer the vehicle.

19. In a road-vehicle, steering and running wheels, a body yieldingly connected therewith, a rotative steering-head carried by the body, a positioning device for the lower end of the head, independent of the body and providing a vertically-movable fulcrum about which said lower end of the head moves, and a connection between the steering wheel or wheels and the lower end of the head, eccentrically attached thereto to operate the steering wheel or wheels by rotative movement of the said head.

20. In a road-vehicle, wheels, a body yieldingly connected therewith, a rotative steering-head supported on the body and having a rigidly-attached foot at and oppositely extended from its lower end, a radius bar pivoted on the steering-axle and jointed at its free end to one extension of the foot, to provide a vertically-movable fulcrum therefor, and an operating connection between the steering wheel or wheels and the laterally-movable extension of the foot.

21. In a road-vehicle, wheels, a body yieldingly connected therewith, an axle, wheel-spindles pivotally mounted thereon, an arm set at an angle on each spindle, and a cross-rod connecting the extremities of the said arms, combined with a rotatable steering-head having at its lower end a rigidly-attached foot, a supporting-bearing for said head, mounted on the vehicle-body, a positioning member connected with and providing a vertically-movable fulcrum for said foot, and a connection between the cross-rod and the foot and attached thereto eccentrically to the head, to rock the wheel-spindles by movement of the steering-head and attached foot on their said fulcrum.

22. In a road-vehicle, a main frame, a body connected therewith by springs, an axle, a horizontal pivot connection between said axle and frame, steering devices carried by the axle, a steering-head mounted on the body and having a rotative and rocking movement relative thereto, connections between the steering devices and the head, to operate the former by rotation of the latter, the lower end of the head being fulcrumed on the axle by a radius-bar, whereby relative movement of the body, frame and axle is permitted without straining the head or its connections.

23. In a road-vehicle, a main frame, a body connected therewith by springs, an axle, a horizontal pivot connection between said axle and frame, a steering-head connected with the body to move therewith as said body moves on its springs, a foot rigidly secured to the steering-head at its lower end, said lower end of the head being fulcrumed on the axle, steering devices, and connections between said devices and the head, to guide the vehicle by rotative movement of the head.

24. In a road-vehicle, wheels, a body connected therewith by springs, an axle, steering devices mounted thereon, a rotative steering-head carried by the body, a rigidly-attached foot at the lower end of and transverse to the head, vertical pivot members located at the ends of and adapted to rock in unison on the foot, a radius-bar mounted on the axle and connected with one of said pivot members, and a connecting-rod between the other pivot member and the steering devices, jointed to the latter, the radius-bar positioning the foot and forming a fulcrum therefor adapted to rise or fall with the movement of the body.

25. In a road-vehicle, wheels, a body yieldingly connected therewith, steering devices for the vehicle, a rotative steering-head carried by the body, a rigidly-attached foot on and transverse to the head, a radius-bar jointed at one end to one end of the foot, and jointed at its other end to a relatively-fixed support, and a rod jointed to the other end of the foot and connective of said foot and steering devices and jointed to the latter, the radius-bar positioning the foot and forming a fulcrum therefor adapted to rise or fall with longitudinal movement of the head.

26. In a road-vehicle, wheels, a body connected therewith by springs, an axle, steering devices mounted thereon, a rotative steering-head carried by the body, a rigidly-attached foot at the lower end of and transverse to the head, vertical pivot members located at the ends of and adapted to rock in unison on the foot, a radius-bar mounted on the axle and connected with one of said pivot-members, and a connecting-rod between the other pivot member and the steering devices, jointed to the latter, the radius-bar positioning the foot and forming a fulcrum therefor adapted to rise or fall with the movement of the body, and dust-caps between said pivot members and the foot, and between the radius-bar, connecting-rod, and said attached pivot members.

27. A steering-head for road-vehicles, having a transverse foot rigidly attached to its lower end, and connected pivot members located at the ends of and mounted on the foot and adapted to rock in unison thereon, said pivot members being parallel to each other.

28. A steering-head for road-vehicles, having a transverse foot rigidly attached to its lower end, and connected pivot members located at the ends of and carried by the foot and adapted to rock in unison thereon, said pivot members being parallel to each other, and dust-caps interposed between the ends of the foot and said pivot members, and also at the ends of each of said pivot members.

29. In a road-vehicle, a main frame, a body connected therewith by springs, an axle, steering devices carried thereby, a steering-head mounted on the body and having a rotative and rocking movement relative thereto, a rigidly-attached foot on the lower end of the head, a radius-bar connecting the axle and one end of the foot, and a connecting-rod between the other end of the foot and the steering devices, said radius-bar and connecting-rod being constructed and arranged to permit of their partial rotative movement without twisting or breaking.

30. In a road-vehicle, a main frame, a body connected therewith by springs, an axle, steering devices carried thereby, a horizontal pivot connection between the frame and axle, a rotative steering-head, a horizontal fulcrum therefor mounted on the body, and connections between the steering devices and the head, to guide the vehicle by rotative movement of the head.

31. In a road-vehicle, propelling mechanism, speed-regulating and reversing devices therefor, a hollow steering-head for the vehicle, having an overhanging arm at its upper end, a rotatable and longitudinally-movable shaft mounted in said head, independent connections between said shaft and the speed-regulating and reversing devices, a hand-controller carried by the overhanging arm and adapted to be rotated and longitudinally moved, and a flexible connection between said controller and the shaft in the steering-head, to operate said shaft in conformity with the movement of the hand-controller.

32. In a road-vehicle, propelling mechanism, speed-regulating and reversing devices therefor, a rotative steering-head having an overhanging arm at its upper end, an external segmental rack vertically movable on and carried by the lower portion of the head to turn therewith, a pinion in continuous engagement with said rack and forming a part of one of the propulsion-controlling devices, a hand-controller carried by the overhanging arm and adapted to be rotated and also longitudinally moved, a rotatable, longitudinally-movable shaft in the head, a flexible connection between the shaft and the hand-controller, means to transform rotative movement of the shaft into vertical movement of the rack, to thereby rotate the pinion, and connections between the other of said propulsion-controlling devices and the shaft, whereby longitudinal movement of the latter will operate said controlling device.

33. In a road-vehicle, propelling mechanism, speed-regulating means therefor, a rotative steering-head having an overhanging arm at its upper end, an external, segmental rack movable on and carried by the lower portion of the head to turn therewith, a pinion in continuous engagement with the rack and forming a part of said speed-regulating means, a rotatable hand-controller carried by the overhanging arm, a shaft mounted in the head and connected with and to be rotated by the hand-controller, and means to transform rotative movement of said shaft into vertical movement of the rack to thereby rotate the meshing pinion and operate the speed-regulating means.

34. In a road-vehicle, a main frame, an axle having wheel-spindles fulcrumed at its ends, main and auxiliary horizontal king-bolts in substantial alinement and pivotally connecting said frame and axle, braces mounted on and extending from the auxiliary king-bolt to or near to the ends of the axle, an upright steering-head, operating connections between said head and the wheel-spindles, a positioning device mounted on the axle and connected with the lower end of the head, and a bearing on the body in which the head is rotatively suspended and providing a fulcrum on which the head is adapted to rock.

35. In a road-vehicle, a truss-frame axle comprising an arched compression member having outturned, upright yokes at the ends thereof, wheel-spindles, pivots therefor extended through said yokes, and a tension member attached to the pivots of the wheel-spindles.

36. In a road-vehicle, axle-bearings, the driving-axle comprising a tubular shaft and a concentric sleeve, each mounted in a bearing and having a rigidly-attached wheel, the shaft extending through the sleeve-bearing, compensating mechanism connecting said shaft and sleeve, and a connecting-rod extended through the wheel-hubs and tubular shaft, to prevent longitudinal displacement of the parts.

37. In a road-vehicle, the main frame having rigidly-attached depending members at the rear end thereof, bearings carried by said members, a compound axle rotatable in said bearings and comprising concentrically-arranged members to which driving-wheels are respectively attached, a compensating mechanism connecting said concentric members, and an intermediate bearing for the axle, adjacent said mechanism and rigidly mounted on the frame, to decrease vibration.

38. In a motor-vehicle, driving-wheels, an axle connecting them, a yieldingly-supported body, a motor carried thereby above the horizontal plane of the said axle, an inclined main driving-shaft for the motor, substantially at right angles to the driving-axle, and a rotatable, flexible power-transmitting connection between the axle and motor-shaft and in alinement with the latter.

39. In a motor-vehicle, driving-wheels therefor, a body yieldingly connected with the wheels, a motor, comprising a boiler and attached engine, carried by and concealed by said body, the engine being attached exteriorly to the boiler and at an angle thereto and having its driving-shaft inclined to the horizontal, and a rotatable power-transmitting connection between the driving-wheels and the engine driving-shaft and substantially in alinement with the latter.

40. In a motor-vehicle, driving and steering wheels therefor, a main frame mounted thereon, a body yieldingly supported on the frame, a motor carried by the body, a rotatable, flexible power-transmitting connection between the motor and driving-wheels, and variable power mechanism mounted solely on said connection, to operate upon and effect a differential rotation between the ends of said connection.

41. In a road-vehicle, a rotatable driving-axle having a bevel-gear carried thereby, an actuating-shaft and a pinion on said shaft in mesh with said bevel-gear, an adjustable conical, rolling, side-thrust bearing for the bevel-gear, opposite the point of engagement of the pinion and gear, and a relatively-fixed support for said pinion and rolling bearing, the gear rotating between the latter and the pinion, the said conical bearing being mounted eccentrically in its support, to be adjustable to compensate for wear.

42. In a road-vehicle, a main frame, a rotatable driving-axle having a bevel-gear carried thereon, an actuating-shaft and a pinion thereon in mesh with said bevel-gear, a support for said pinion through which the shaft passes, a conical, rotatable side-thrust bearing carried by said support and bearing upon the bevel-gear opposite the pinion, to prevent relative lateral movement of the bevel-gear and pinion, and a depending connection between said frame and support and jointed to each.

43. In a motor-vehicle, steering and driving wheels, a main frame, a rotatable compound axle carried thereby, for the driving-wheels, compensating mechanism connecting the axle members, a bevel-gear forming a part of said mechanism, an actuating-pinion in mesh with said gear, a rolling side-thrust bearing for the bevel-gear, a common yoke-like support for said pinion and bearing mounted on said frame and axle, and a body yieldingly mounted on the frame, combined with a motor carried by the body, and a flexible, rotatable, power-transmitting connection between the motor and the actuating-pinion.

44. In a motor-vehicle, a motor, a driving-axle for the vehicle, and power-transmitting connections between them, said connections including shafts connected respectively with the motor and the axle, clutch mechanism and speed-reducing gearing between and carried solely by the shafts, and means to throw said clutch mechanism into operation and render the reducing-gearing inoperative, and vice versa.

45. In a motor-vehicle, a driving-axle, a motor and a power-transmitting shaft rotated thereby, a clutch member fast thereon, a bevel-gear and pinions intermeshing therewith, carried by a spider, said gear and spider being rotatable with the shaft and also movable longitudinally thereof, a fixed bevel-gear to at times mesh with the pinions, an actuating-shaft to rotate the driving-axle of the vehicle, a clutch member thereon, and means to disengage the pinions from the fixed gear and to bring the clutch members into coöperative relation, and vice versa.

46. In a motor-vehicle, a motor, a driving-axle having a bevel-gear thereon, an actuating-pinion in mesh therewith, and a rotatable power-transmitting connection between said pinion and the motor, combined with power-varying means, comprising a rotatable shaft, a shaft for the pinion in alinement therewith, a clutch member rotatable with the pinion-shaft, a coöperating clutch member and a bevel-gear rotatable with said motor-actuated shaft, the gear being in constant mesh with the bevel-pinions carried by a spider, a fixed bevel-gear facing said rotatable bevel-gear, and means to move said rotatable bevel-gear and the spider longitudinally, to bring said pinions into engagement with the fixed gear and thereby effect differential rotation of said motor-actuated and pinion shafts, or to bring the clutch members into coöperative position, to rotate said shafts at the same speed.

In testimony whereof I have signed my name to this specification in the presence of two subscribing witnesses.

GEORGE E. WHITNEY.

Witnesses:
GEO. W. GREGORY,
AUGUSTA E. DEAN.